Figure 1:
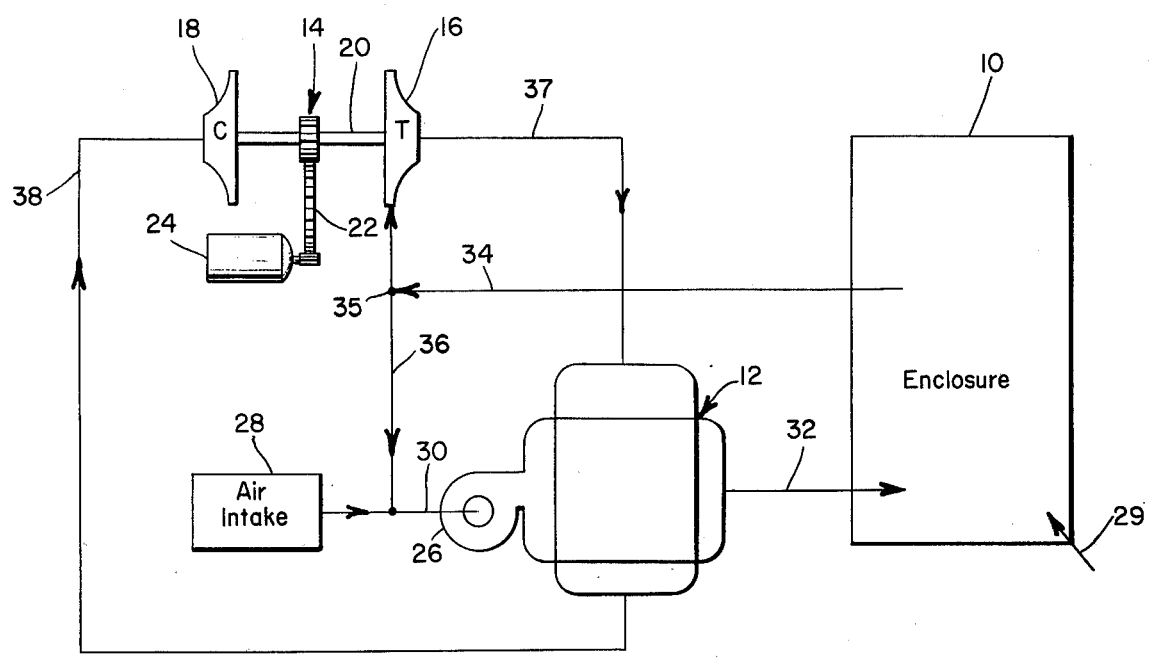

United States Patent [19]

Kinsell et al.

[11] 4,015,438
[45] Apr. 5, 1977

[54] AIR CYCLE AIR CONDITIONING SYSTEM FOR VEHICLES

[75] Inventors: Robert C. Kinsell, Los Angeles; James C. Noe, Canoga Park; John P. Byrne, Westminster, all of Calif.

[73] Assignee: The Garrett Corporation, Los Angeles, Calif.

[22] Filed: Aug. 29, 1975

[21] Appl. No.: 609,128

[52] U.S. Cl. .................................. 62/88; 60/599; 62/90; 62/91; 62/172; 62/402; 123/119 CD

[51] Int. Cl.² ........................................ F25B 9/00

[58] Field of Search ............ 62/86, 87, 88, 90, 91, 62/401, 402, 172, DIG. 5; 98/1.5; 123/119 CD; 60/599

[56] References Cited

UNITED STATES PATENTS

| | | | |
|---|---|---|---|
| 2,526,103 | 10/1959 | Wood | 62/87 X |
| 2,734,443 | 2/1956 | Wood | 62/172 X |
| 2,767,561 | 10/1956 | Seeger | 62/87 X |
| 3,132,012 | 5/1964 | Walker | 62/91 X |
| 3,623,332 | 11/1971 | Fernandes | 62/87 X |
| 3,877,246 | 4/1975 | Shultze | 62/86 X |

Primary Examiner—Ronald C. Capossela
Attorney, Agent, or Firm—Joel D. Talcott; Albert J. Miller

[57] ABSTRACT

Air at substantially ambient pressure is cooled in a heat exchanger and introduced into an enclosure for cooling. The air is withdrawn from the enclosure and a portion of the air is expanded through a turbine for additional cooling and passed through the heat exchanger for the removal of heat therefrom. The air is then compressed to substantially ambient pressure and expelled. Additional cooling of the expanded air from the turbine may be obtained by evaporating a fluid therein. The fluid may be water condensed in, and withdrawn from, the heat exchanger.

16 Claims, 2 Drawing Figures

AIR CYCLE AIR CONDITIONING SYSTEM FOR VEHICLES

This invention relates to air conditioning systems and more particularly to an air cycle air conditioning system adapted for use in railroad cars or other environment wherein it is desirable to introduce substantial amounts of fresh air into an enclosure.

It is now fairly common to utilize air conditioning systems for rail transportation vehicles such as railroad and subway cars. However, it has generally been necessary to utilize vapor cycle systems which use a refrigerant, such as Freon gas, for cooling the air to be introduced into the enclosure. As is well known, such air conditioning systems utilize substantial amounts of power.

Air cycle air conditioning systems have not generally been used in this application because of the need in prior art systems for a source of high pressure bleed air. Accordingly, only on occasional turbine driven trains has such an air conditioning system been used.

In accordance with this invention, an air conditioning system is provided which cools fresh air at substantially ambient pressure and introduces it into the vehicle cabin for cooling. A portion of the air withdrawn from the cabin is recirculated while the remainder is used as the refrigerant in the cooling cycle by expansion through a turbine for cooling, passage through a heat exchanger for the removal of heat from fresh and recirculated air, and repressurization to ambient in a compressor for expulsion of the air. If desired, evaporative cooling may be used to greatly increase the cooling capacity of the low pressure air.

Figure 2:
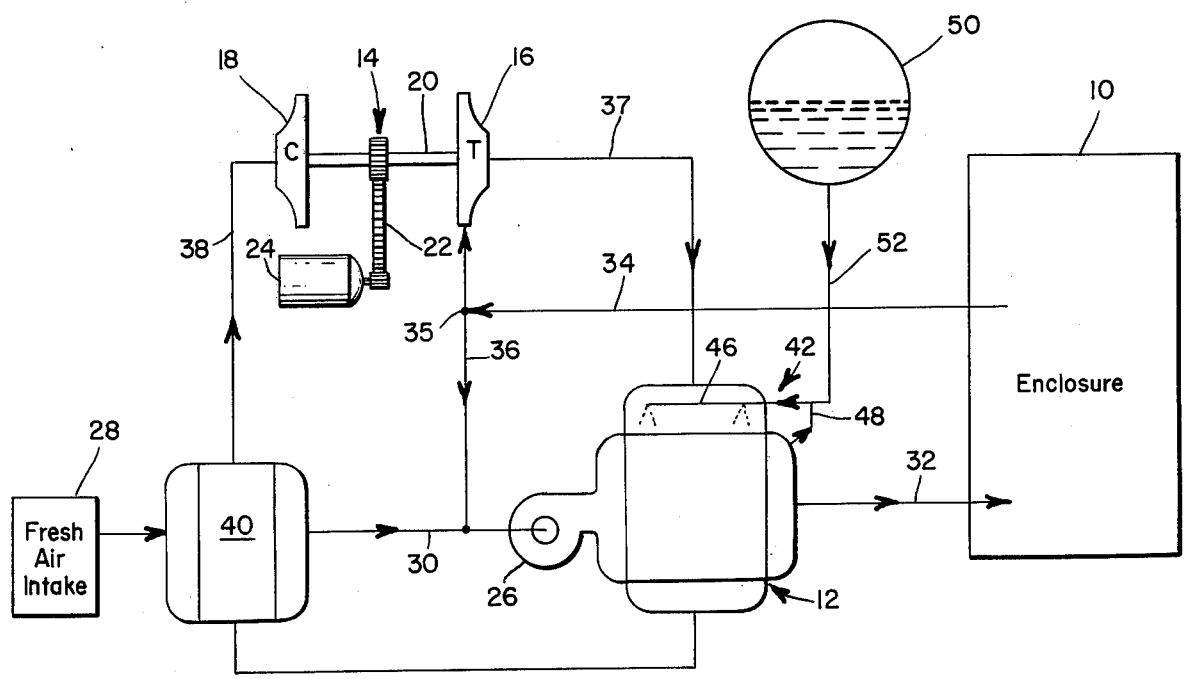

The advantages of this invention can be best understood when the following specification is read in conjunction with the appended drawings, wherein:

FIG. 1 is a generally schematic diagram illustrating the cooling cycle of the air conditioning system of this invention; and FIG. 2 is a generally schematic diagram illustrating a preferred embodiment of the air conditioning system of this invention.

Referring now to the drawings, FIG. 1 illustrates an air conditioning system in accordance with this invention for providing cool fresh air to an enclosure 10 which may be the passenger cabin of a rail car. The air conditioning system utilizes a primary heat exchanger 12 and a turbocompressor 14 which comprises suitable expander, such as a turbine 16 and a compressor 18 mounted for rotation on a shaft 20 which may be connected by suitable gearing 22 to a variable speed motor 24 for providing any required additional energy for the operation of the compressor 18. A suitable blower 26 is preferably used to propel fresh and recirculated air into the enclosure 10. Fresh air for the enclosure 10 may be drawn in through a fresh air intake 28 and also by leakage into the enclosure as illustrated by an arrow 29.

The blower 26 propels fresh and recirculated air at generally ambient pressure and through a conduit 30 to the heat exchanger 12. The air passes through one passage of the heat exchanger 12 for the withdrawal of heat therefrom by cooled air passing through another passage of the heat exchanger. The cooled air passes through a conduit 32 into the enclosure 10 for cooling and renewal of oxygen therein.

The air in the enclosure 10 is withdrawn through a conduit 34. At a junction 35 in the conduit 34 most of the air is directed through a conduit 36 for recirculation. A small portion of the air is directed to and expanded through the turbine 16 to decrease its temperature and pressure. This expanded cooled air is transported through a conduit 37 to the heat exchanger 12 and passes through the other passage thereof for the removal of heat and energy from the heat exchanger. The air then travels through a conduit 38 to the compressor 18 which, powered by the turbine 16 and variable speed motor 24, compresses the air back to ambient pressure to be exhausted into the atmosphere.

In this cycle, fresh and recirculated air is first cooled in the heat exchanger 12 and fed to the enclosure 10. Following its use in the enclosure, a portion of the air is utilized in the air cycle for the removal of heat from the heat exchanger 12 and is exhausted into the atmosphere. Only the air which is utilized for air cycle cooling and is thus not returned to the enclosure 10 need be replaced by fresh air drawn into the fresh air intake 28 or leaked into the enclosure 10.

A preferred embodiment of the air conditioning system of this invention is illustrated in FIG. 2 wherein component parts identical to those utilized in the system of FIG. 1 have been similarly numbered. In the preferred embodiment, a secondary heat exchanger 40 and evaporative cooling means 42 are utilized to provide more effective and efficient cooling of the enclosure 10.

One passage of the secondary heat exchanger 40 is interposed in the conduit 30 between the fresh air intake 28 and the blower 26 for precooling the fresh air prior to its passage through the primary heat exchanger 12. The other passage of the secondary heat exchanger 40 is interposed in the conduit 38 between the primary heat exchanger 12 and the compressor 18.

The evaporative cooling means 42 comprises a sprayer 46 connected to a source of fluid. The sprayer may be positioned in the conduit 37 or in an entry portion of the passage of the primary heat exchanger 12 which carries the low pressure air from the turbine 16. If desired, it may even be located upstream of the turbine 16. In the preferred embodiment, the fluid sprayed into the heat exchanger is water which may be withdrawn from the load side of the heat exchanger wherein, as is well known to those skilled in the art, substantial amounts of water will be condensed from the fresh air as it is cooled. This water is transported to the sprayer 46 through a pipe 48.

Because the air leaving the refrigeration turbine is at low pressure, typically about 8–10 pounds per square inch (absolute pressure), its ability to evaporate water is greatly enhanced. Thus, the water condensed on the load side of the primary heat exchanger 12 can be sprayed into the cooling side of the heat exchanger where it is evaporated. This vaporization of the water requires a substantial amount of heat energy, about 1000 BTUs per pound, so that substantial additional cooling of the fresh air being blown into the enclosure 10 can be provided. By using an additional water supply 50 which may be any suitable water container connected by a pipe 52 to the sprayer 46, additional evaporative refrigeration can be obtained which further reduces the work required of the air cycle and thus enhances the amount of cooling which may be obtained with a turbocompressor of a given size.

Fresh air at substantially ambient pressure and temperature is drawn into the fresh air intake 28 and passed through the secondary heat exchanger 40. If the fresh air is, for example, at a temperature of about 105°

F, it will be reduced in the secondary heat exchanger 40 to a temperature of about 80° F. This fresh air is then mixed with some return air from the enclosure 10, which, at a temperature of about 75° F, serves to further cool the fresh air, and is blow through the primary heat exchanger 12 into the enclosure 10 at a temperature of about 56° F. As previously noted, when the fresh air is cooled in the primary heat exchanger 12, substantial amounts of moisture are condensed and may be collected for use in the evaporative cooling system 42.

The air exhausted from the enclosure 10 at a temperature of about 75° F passes through the conduit 34 to the junction 35. Most of the air is recirculated and the remainder is expanded through the cooling turbine 16 to a temperature of about 35° F and a pressure of about 8–10 PSIA. It should be noted that the use of normally expended exhaust air from the enclosure 10 as the refrigerant in the cooling cycle produces significant energy savings. Since the air introduced into the cooling cycle is substantially cooler than ambient temperature outside the enclosure (30° cooler in this example), the work required of the air cycle is further reduced.

The low pressure air is passed through the primary heat exchanger 12 withdrawing heat therefrom, due to its lower temperature and the evaporative cooling, to cool the air entering the enclosure 10. The low pressure air is thus heated to a temperature of about 70° F. This air is still substantially cooler than the ambient fresh air (105° F) so that further energy savings may be accomplished by passing the air through the secondary heat exchanger 40 to provide initial cooling of the fresh air by withdrawing heat from the heat exchanger. This raises the temperature of the low pressure air to about 95° F. The pressure of the air is then raised to ambient pressure by the compressor 18 which expels the air, now at a temperature of about 208° F, into the atmosphere.

Thus, an air conditioning system is provided which feeds cool fresh air into a sealed enclosure and uses the cooled air as the refrigerant in an air cycle refrigeration system operating at sub-atmospheric pressures. Evaporative cooling, enhanced by the low pressure of the air, provides added cooling so that the power and cost requirements of this system can be reduced.

If desired, various modifications of the air conditioning system can be made without departing from the spirit and scope of this invention. For example, instead of using the motor 24 for powering the compressor 18, the compressor may be powered solely by the turbine 16 and expel the air to a source of less-than-ambient pressure, such as an engine air intake or an additional compressor.

We claim:

1. In combination:
   an enclosure to be cooled;
   a source of air at substantially ambient pressure;
   a heat exchanger having first and second air passages;
   blower means for propelling air from the source through the first passage of the heat exchanger for cooling and into the enclosure;
   means for directing at least a portion of the air from the enclosure to a turbine means for lowering the temperature and pressure of the air;
   means for directing the air from the turbine means through the second passage of the heat exchanger for removal of heat from the exchanger; and
   compressor means for increasing the pressure of air from the second passage of the heat exchanger for expulsion.

2. The combination of claim 1 wherein said source comprises air intake means.

3. The combination of claim 1 wherein said source comprises said enclosure.

4. The combination of claim 1 including means for returning air from said enclosure other than said portion to said blower means.

5. The combination of claim 1 wherein said source includes air intake means, and including an additional heat exchanger having first and second passages, means for directing air from the air intake means through the first passage of the additional heat exchanger, and means for directing air from second passage of said heat exchanger through the second passage of the additional heat exchanger.

6. The combination of claim 1 including evaporative cooling means for spraying water into the air to absorb heat within the heat exchanger.

7. The combination of claim 6 wherein said evaporative cooling means comprises a source of water and means for spraying the water into the air upstream of the first passage of said heat exchanger.

8. The combination of claim 7 wherein said source of water comprises water collection means in the second passage of said heat exchanger.

9. The combination of claim 8 wherein said source of water includes a water storage tank.

10. An air conditioning system for cooling an enclosure, said system comprising a heat exchanger, blower means for propelling air through the heat exchanger for cooling means for directing the cooled air into the enclosure, means for directing a first portion of air removed from the enclosure to the blower means, turbine means for receiving a second portion of air removed from the enclosure for lowering the temperature and pressure of the air, means for directing the second portion of air from the turbine means through the heat exchanger for removal of heat therefrom, and compressor means for receiving and expelling the second portion of air from the heat exchanger.

11. An air conditioning system as in claim 10 including air intake means for feeding outside air to said blower means.

12. An air conditioning system as in claim 11 wherein said air intake means includes an additional heat exchanger for cooling said outside air, and said second portion of air from said heat exchanger is fed through the additional heat exchanger for the removal of heat therefrom before being received by said compressor means.

13. An air conditioning system as in claim 10 including means for introducing liquid into said second portion of air for removal of heat by vaporization in said heat exchanger.

14. A method of cooling an enclosure, said method comprising the steps of cooling air at substantially ambient pressure by movement through one passage of a heat exchanger, introducing the cooled air into the enclosure, withdrawing air from the enclosure and expanding at least a portion of the air through a turbine, moving the expanded air through another passage of the heat exchanger, for removing heat therefrom and compressing the air for expulsion at substantially ambient pressure.

15. The method of claim 14 including the additional step of introducing a liquid into the expanded air from the turbine for evaporative cooling in the heat exchanger.

16. The method of claim 15 including the further step of withdrawing condensed moisture from the heat exchanger for introducing into the expanded air.

* * * * *

Disclaimer 4,015,438.—*Robert C. Kinsell*, Los Angeles, *James C. Noe*, Canoga Park, and *John P. Byrne*, Westminster, Calif. AIR CYCLE AIR CONDITIONING SYSTEM FOR VEHICLES. Patent dated Apr. 5, 1977. Disclaimer filed Apr. 25, 1977, by the assignee, *The Garrett Corporation*.

Hereby enters this disclaimer to claims 1–16 of said patent.

[*Official Gazette July 12, 1977.*]